United States Patent [19]

Jespersen

[11] Patent Number: 5,487,584
[45] Date of Patent: Jan. 30, 1996

[54] SWING AWAY SUPPORT SYSTEM FOR A COVERING

[75] Inventor: Lee Jespersen, Jacksonville, Fla.

[73] Assignee: Wahpeton Canvas Co. South Dakota, Inc., Yankton, S. Dak.

[21] Appl. No.: 271,567

[22] Filed: Jul. 7, 1994

Related U.S. Application Data

[63] Continuation of Ser. No. 30,681, Mar. 12, 1993.

[51] Int. Cl.$^6$ ........................................ B60P 7/04
[52] U.S. Cl. .......................... 296/100; 296/104; 135/144; 135/151
[58] Field of Search ........................ 296/98, 100, 104, 296/118; 105/377; 135/122, 124, 130, 144, 145, 146, 151, 156; 160/65, 72, 73, 81, 168.1 V, 82, 176.1 V

[56] References Cited

U.S. PATENT DOCUMENTS

| Re. 31,746 | 11/1984 | Dimmer et al. | 296/98 |
|---|---|---|---|
| 1,358,978 | 11/1920 | Norton | 296/104 |
| 2,893,329 | 7/1959 | Janeczko | 105/377 |
| 4,248,475 | 2/1981 | Johnson | 296/100 |
| 4,272,119 | 6/1981 | Adams | 296/100 |
| 4,286,612 | 9/1981 | Neal et al. | 135/146 X |
| 4,484,777 | 11/1984 | Michel | 296/98 |
| 4,505,512 | 3/1985 | Schmeichel et al. | 296/98 |
| 4,691,957 | 9/1987 | Ellingson | 296/98 |
| 4,709,956 | 12/1987 | Bowman | 296/100 |
| 4,854,633 | 8/1989 | Kraft et al. | 296/104 |
| 4,915,439 | 4/1990 | Cramaro | 296/118 X |

FOREIGN PATENT DOCUMENTS

| 78533 | 6/1962 | France | 296/100 |
|---|---|---|---|

OTHER PUBLICATIONS

Roll tops for Dump Trailers —AERO Industries, Inc., Copyright 1990, Brochure.

*Primary Examiner*—Dennis H. Pedder
*Attorney, Agent, or Firm*—Jones, Day, Reavis & Pogue

[57] ABSTRACT

A support for a covering over one open top of a trailer box or other container which can be displaced from the opening when the covering is removed. The support has a series of parallel bows pivotally attached at one end to one side of the opening and configured at the other end to reversibly engage the other side of the opening. A perpendicular ridgepole is pivotally connected to the bows and assures that all the bows move in unison or are uniformly prohibited from movement. A lock on one bow is simultaneously released when a rope is pulled to pivot the bows from the support position to the retracted position. A method is disclosed of pivoting the bows at least partially out of the top opening of the box or container.

18 Claims, 5 Drawing Sheets

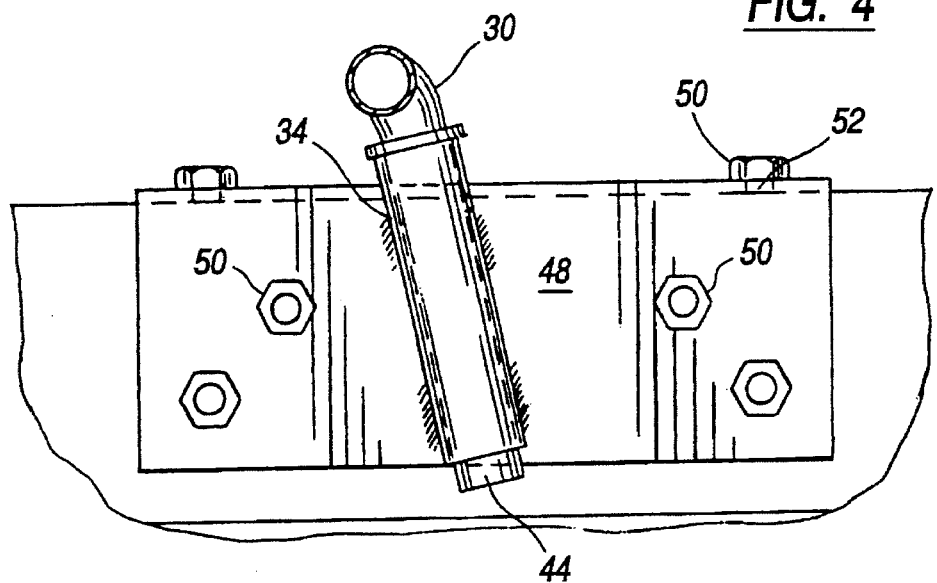
FIG. 4
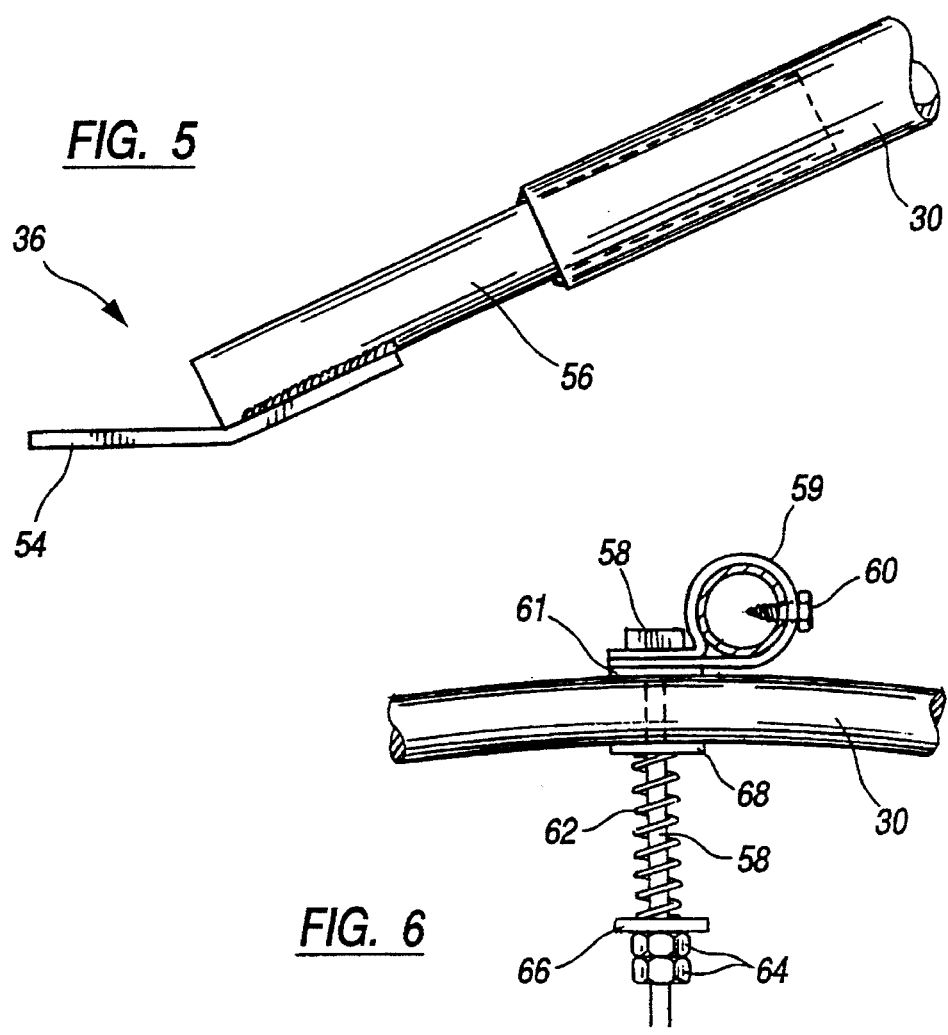
FIG. 5
FIG. 6

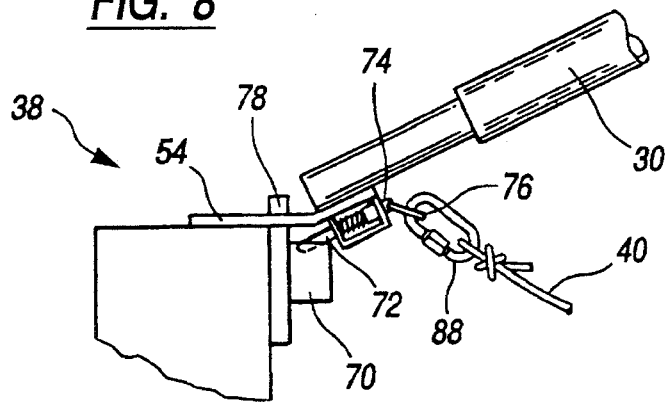
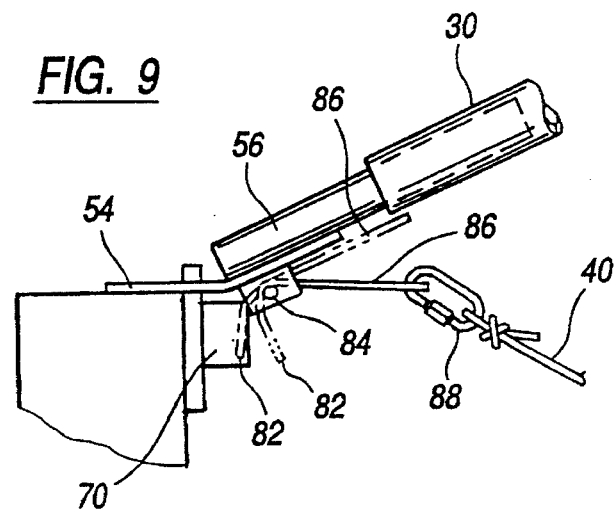
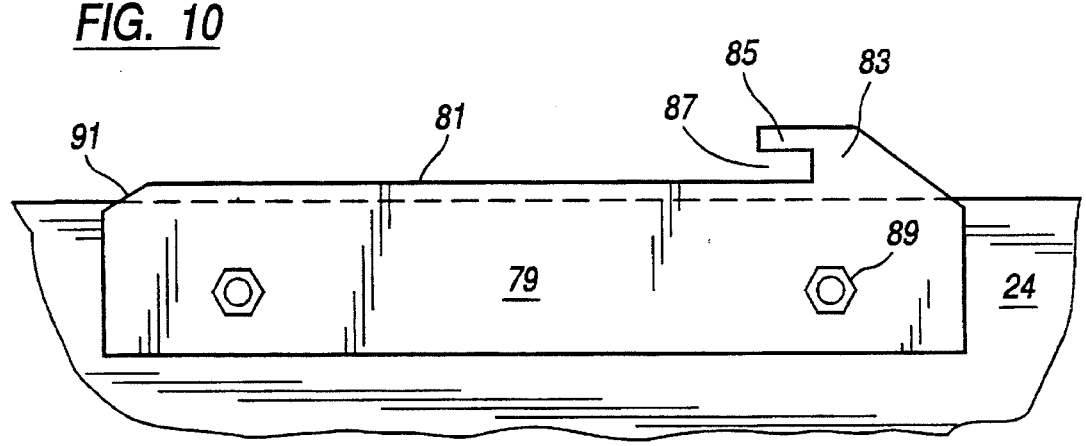

5,487,584

SWING AWAY SUPPORT SYSTEM FOR A COVERING

This is a continuation of application Ser. No. 08/030,681 filed on Mar. 12, 1993, now abandoned.

BACKGROUND OF THE INVENTION

The invention relates generally to supports for removable covers used on open top trucks, trailers or containers. The invention relates specifically to a support system which can be quickly and easily moved out of the way of material being dumped in or removed from a truck, trailer or container.

The top opening of trucks, trailers and containers are often covered by a tarp made of canvas or other material to protect the contents from the elements and prohibit the escape of material out of the container during high winds or high speed movement. In recent years, canvas-type tarp coverings for truck trailers have been rolled and unrolled across the top of the trailer with the use of a bar that runs the length of the trailer. For these types of devices, the covering material is rolled on to (or unrolled from) a cylindrical bar as the bar crawls across the top of the box. Examples of roll-up tarps that operate this way include the SHUR-LOK® fully automatic roll-up tarp, which is the subject of Dimmer et al. United States Patent No. Re. 31,746. Later variations of the SHUR-LOK® roll-up tarp are shown in the Schmeichel et al. U.S. Pat. No. 4,505,512 and the Ellingson U.S. Pat. No. 4,691,957.

As shown in the Dimmer et al. and Ellingson patents referenced above, roll-up tarps generally require a series of bows spanning the width of the top opening of the trailer box or container. The bows and the ridgepole running across the centers of the bows support the tarp material over the load contained in the trailer, facilitate movement of the roll bar, and assist placement of the covering material over the opening. However, these prior bows hinder access to the interior of the box or container. Moreover, the items passing through the opening, such as equipment or rocks, may be relatively large or weighty, damaging the bows and ridgepole if contact is made. Even regular exposure to small items, such as grain particles, will cause excessive abrasion of the bows and ridgepole by extended contact over time. Hence, in the past, obtaining the advantages of using supporting bows and a ridgepole to span the top width of an opening of a trailer box or container has meant that a frame-like obstruction would be present in the opening during loading and unloading of material into the box.

An object of the present invention is to provide a support for a removable covering which can be easily and quickly moved at least partially out of the opening when the covering is removed.

Another object of the present invention is to provide a support for a covering which can be locked into position when used to support a covering and unlocked and swing out of the way when the covering is not in use.

Yet another object of the invention is to provide a combination covering and support which can be at least partially displaced from the opening when the opening is not covered.

It is a further object of the invention to provide a vehicle having an open top container and a structure which can support a covering over the opening but which also can easily and quickly be moved at least partly out of the opening when the support is not covered.

It is yet a further object of the invention to provide a method of at least partially displacing a support structure out of a truck trailer or container opening when it is not being used to support a tarp covering.

Other objects, features and advantages of the invention will be apparent from the following description and illustration of its preferred embodiment.

SUMMARY OF THE INVENTION

The present invention provides a support structure capable of supporting a covering over an opening, but which can be quickly, easily and reversibly displaced from at least part of the opening when the opening it not covered. Use of the invention allows greater exposure of the interior of an uncovered trailer or box, allows unobstructed passage of materials through the opening, and avoid wear and physical damage to the support resulting from contact with items passing through the opening.

The support accomplishes these advantages by using bows which are pivotally connected to one side of the opening and which reversibly engage the opposing side of the opening. The bows are pivotally attached to one another by a rigid pole, such as a ridgepole so that movement of the pole (or any bow) will cause the entire series of bows to pivot in unison. The structure can swing between a position where all the bows span the opening to support the tarp to a position where the bows are uniformly retracted.

All the bows are reversibly locked in a position spanning the width of the opening by restricting movement of any bow because of the rigid ridgepole connection between the bows. A latch mechanism on the swinging end of one of the bows therefore prevents movement of all the bows out of the spanning position. Releasing the latch will allow all the swing bow ends to pivot away from the side of the opening, removing the bows from at least a portion of the opening. Swinging the bows back toward the spanning position causes the latch to re-engage.

A rope or other means to move the structure into and out of the locked position spanning the opening is attached to the rigid pole or a bow. Pulling the rope will release the latch and retract the support to the displaced position. The rope can be held in a retainer hook on the back of the box for convenient access.

The invention also contemplates a combination of both the pivoting structure and a roll-up type covering. The covering can be rolled across the support to roll and unroll the covering over the opening in a conventional manner. However, when the covering is rolled-up, the support can be retracted from a portion of the opening as described above.

The invention further contemplates a vehicle which has a covered trailer or container associated with it, the covering supported by the retractable structure described above. The vehicle could be a conventional grain carrying truck and trailer, or a highly specialized vehicle such as a salt, refuse, or fertilizer truck. The inventive truck provides increased access to an enclosure having a structurally supported covering, and reduced potential for damage to the supporting structure during loading and unloading.

BRIEF DESCRIPTION OF THE DRAWING

FIG. 4 shows a side elevational view of the bow hinge of the preferred embodiment.

FIG. 5 shows a side elevational view of the swinging end of a bow of the preferred embodiment.

FIG. 6 shows a partial cross-sectional view at section lines 6—6 of FIG. 2.

FIG. 8 shows a side elevational view of the lock mechanism of the preferred embodiment.

FIG. 9 shows a side elevational view of an alternative embodiment of the lock mechanism.

FIG. 10 shows a side elevational view of the combined landing plate and stop.

DETAILED DESCRIPTION OF

THE PREFERRED EMBODIMENT

Figure 1:
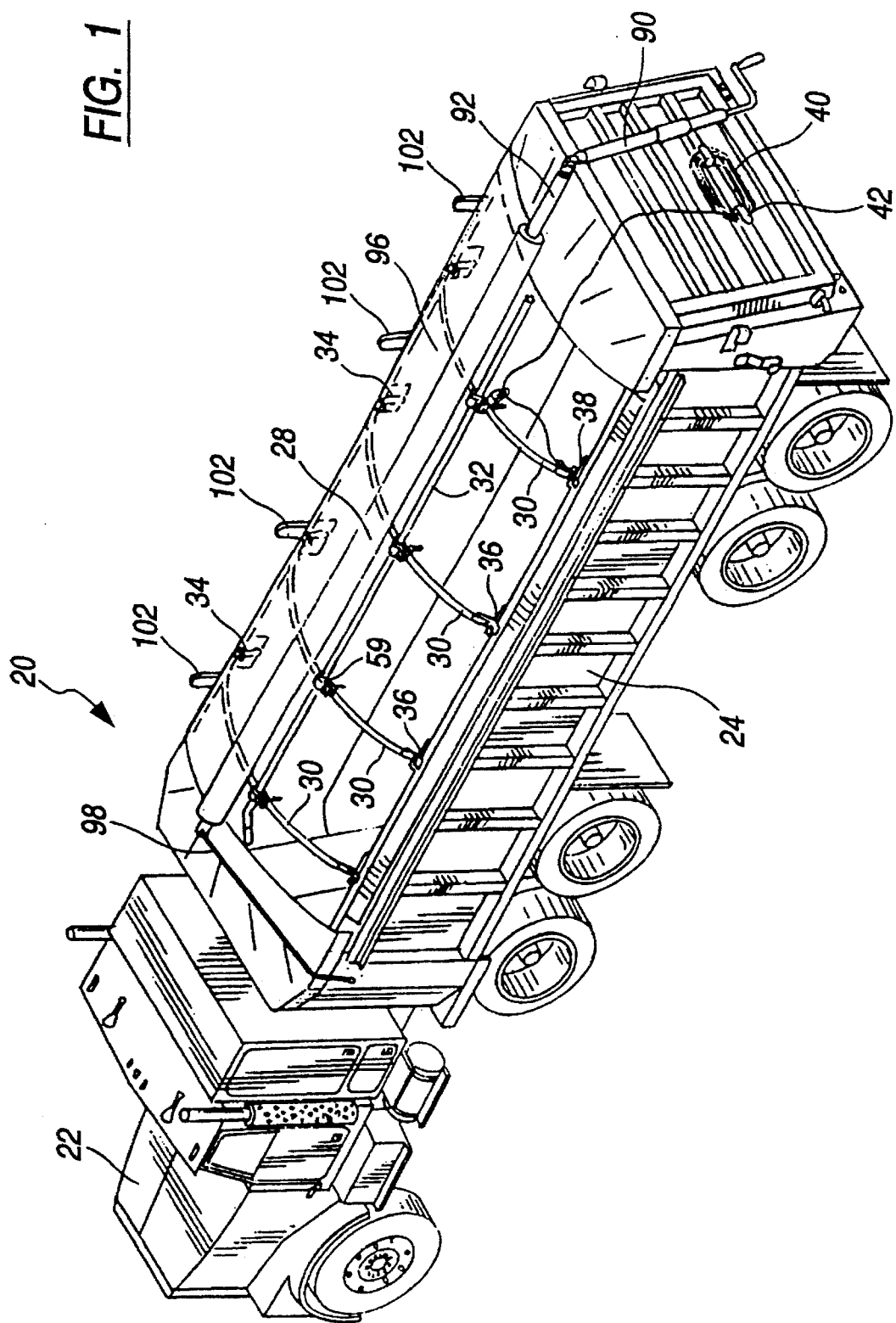
FIG. 1 shows a perspective view of the preferred embodiment of the invention.
Figure 2:
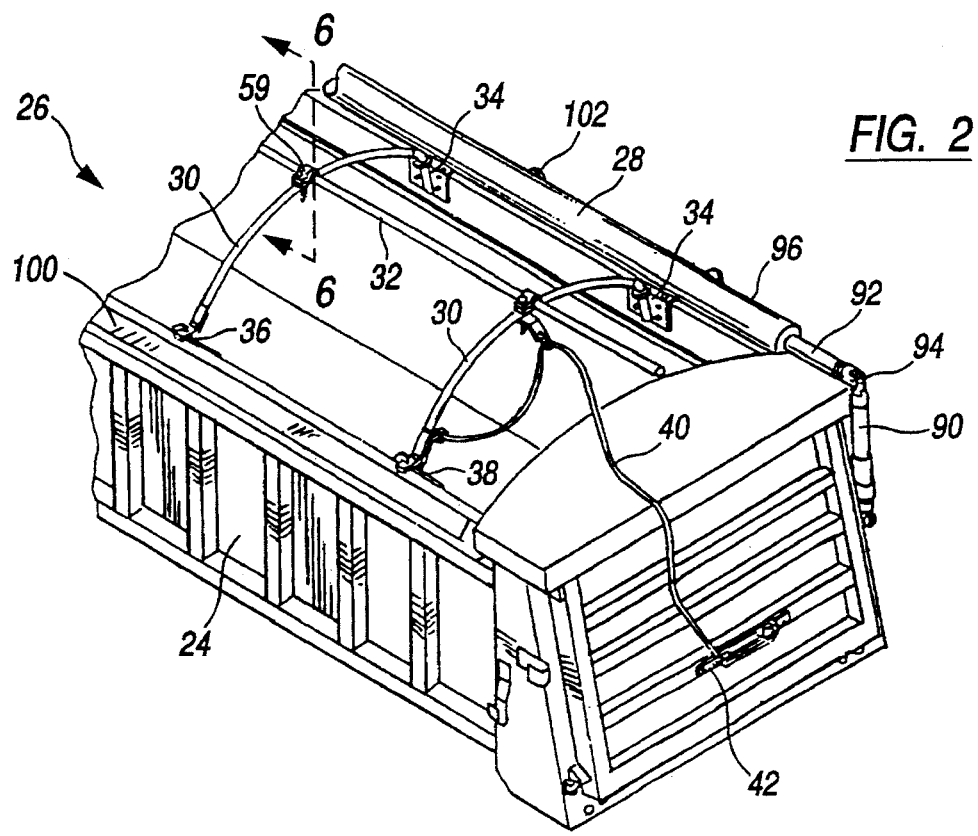
FIG. 2 shows an enlarged perspective view of a portion of the preferred embodiment, with covering completely rolled back.

The preferred embodiment of the present invention is designated as 20 on FIG. 1. It includes generally a truck 22, truck box or trailer 24, support structure 26 and roll-up tarp 28. For purposes of this invention, the truck 22, truck box 24 and roll-up tarp 28 are conventional items known in the art. The support structure alone and the combination of the support structure with the truck, truck box and roll-up tarp are new and inventive.

The preferred embodiment of the support structure includes bows 30, ridgepole 32, hinge 34, side-engaging foot 36, lock 38, actuating rope 40, and retaining hooks 42. The drawing shows the preferred embodiment with four parallel bows and one perpendicular ridgepole located midway across the bows. Alternatively, the invention could use two or more non-parallel bows, and one or more non-perpendicular ridgepoles spaced anywhere along the width of the bows.

Each bow has a hinge engaging post 44 on one end and the side engaging portion 36 on the other. The post 44 fits into the cylindrical hinge 34 which has a bearing-type surface to allow for free rotational movement of the post when torque forces are applied through the bows to the post. This allows for free pivotal movement of the bows 30 about the hinges 34.

Each hinge is attached by welding or other suitable means to the side of the box 24 at opening 46 by attachment plate 48. Plate 48 contains screw or bolt 50 which pass through receiving holes 52 for mounting the plate to the side of the box 24. The hinge and associated post are oriented on the plate such that the other end of the bow will contact the opposite side of the opening when the bow is perpendicular to the length of the box 24. The hinge angle may be oriented as desired to cause a lifting of the bow out of the opening when it is pivoted from the locked position. The pivoting will raise the bows by up to a foot or more depending on the angle of the hinge. This action helps the bows to clear heaped loads when the bows are swung into or out of the spanning position.

The side-engaging portion 36 on the end of the bow 30 opposite the post 44 includes side engaging foot 54 and a second cylindrical portion 56 which is partially inserted into and permanently attached by welding or other known means to the bow end. Foot 54 engages and rests upon the top edge of the box 24 on the side of the opening 46 opposite from the hinge side. The foot 54 can withstand the downward pressure of the weight of the unrolled tarp on the bows even when such weight is increased by rain, snow, wind or high speed shear forces. The foot 54 is free to slide laterally along the top edge of box 24, except as restricted by the lock mechanism and stops as described below.

The bows 30 are rigidly connected to one another by ridgepole 32. The ridgepole is pivotally connected to the bows 30 about mid-way across the width of the opening 46. The pivotal connection between the bows and the ridgepole includes a bolt 58 (FIG. 6) which is connected to the ridgepole 32 by collar 59 and screw 60 and passes through the bow 30. A plastic washer 61 acts as a bearing surface between the bow 30 and the ridgepole 32, reducing friction between the contacting points as they move relative to one another. A spring 62 is biased against the lower surface of the bow 30 by nuts 64 and washer 66. A washer 68 between the spring and the bow 30 also reduces friction as those parts move relative to one another.

The spring exerts a pinching force of the bow 30 with the ridgepole 32. As the bows are swung from a position spanning the width of the opening 46, with ridgepole 32 perpendicular to the bows 30, to a retracted position where the ridgepole 32 is at an acute angle with the bows, a separation of the intersection of the ridgepole and bows occurs. The spring 62 and bolt 58 connection allows for this movement without damage to the ridgepole, bows, or pivot connection itself.

Figure 7:
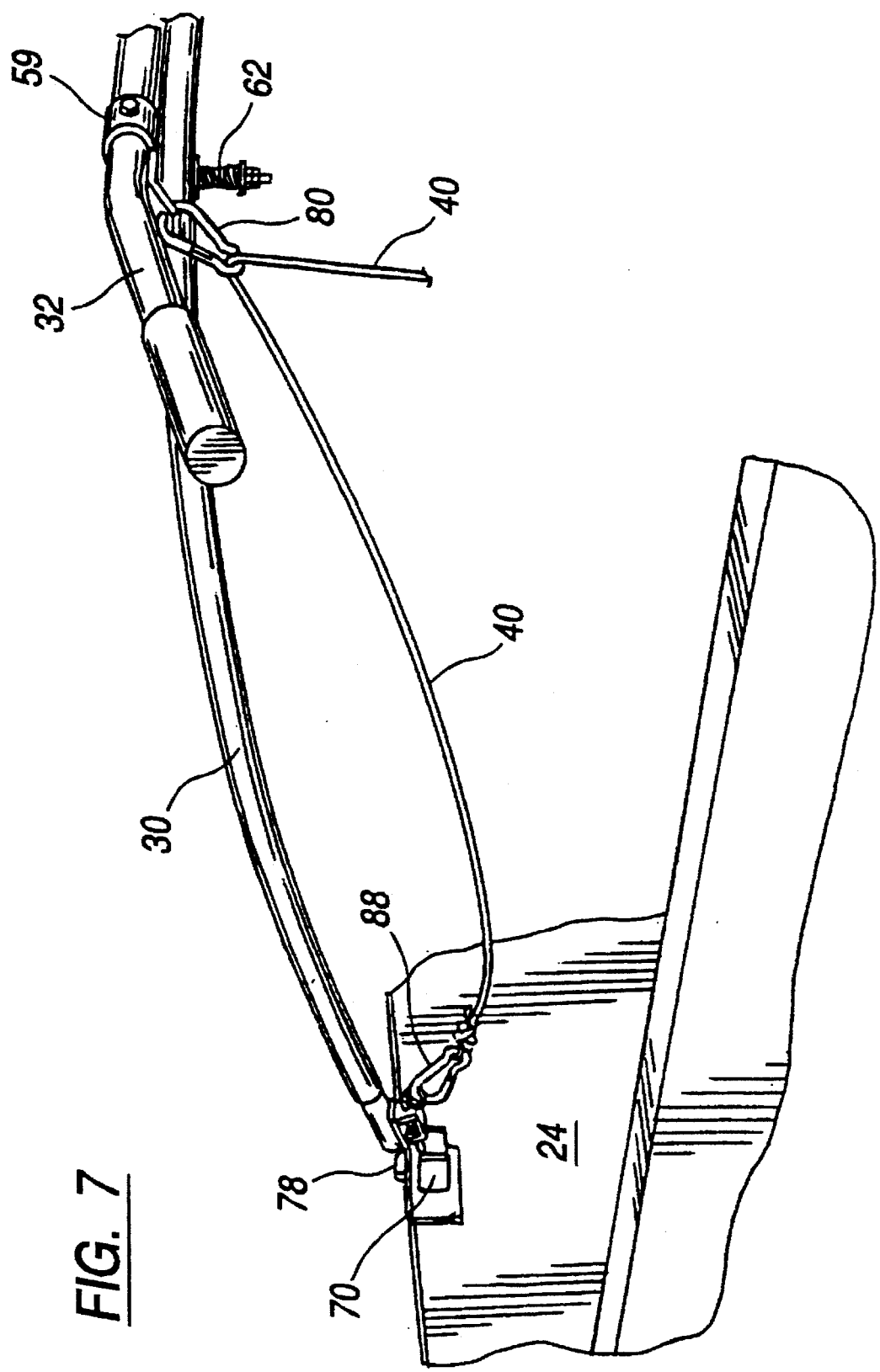
FIG. 7 shows a forward perspective view of the retracting rope and lock mechanism of the preferred embodiment.

The movement of the engaged bows 30 is restricted by a lock mechanism 38 on the reversibly engaging end of the most rearward bow. With reference specifically to FIGS. 7 and 8, the lock mechanism includes an angled plate 70 attached to the side of the box 24 in a position to cooperate with the latch tongue 72 slideably held in rectangular mounting 74 on the bow end. The tongue is spring biased such that movement of the actuating portion 76 of the latch against the spring bias will cause the tongue 72 to move to the right (as shown in FIG. 8) and to escape the blocking effect of the plate 70.

The plate 70 is angled outward from the side of the box 24 to contact and displace the tongue around the plate during the final few degrees of movement of the bow end to the spanning position. When the bows reach the full spanning position, the tongue 72 slides to the left, thereby restricting movement in the reverse direction. The plate 70 has stop 78 to prohibit the foot 54 of the rearward most bow from passing beyond the perpendicular to the longitudinal dimension of the box, i.e., the spanning position.

An alternative embodiment of the lock mechanism shown in FIG. 9 utilizes a tongue 82 which is pivotally attached to the bow end by hinge 84. Upward movement of actuating portion 86 acts to retract tongue 82 so that it can escape plate 70. Generally, the spring biased tongue 72 of the preferred embodiment provides a more positive engagement, requiring a more substantial pulling force to release the lock than the pivotally attached tongue 82 of the alternative embodiments.

Preferably, the foot 54 of the side-engaging end 36 of each bow 30 slides onto and rests upon the upper edge of the box 24 opposite the side to which the hinges 34 are attached. A uniform surface is provided for each foot 54 by a combined landing and stop plate 79 (see FIG. 10). The plate 79 includes a landing surface 81 raised slightly above the top edge of the box 24 to provide an unobstructed sliding surface for the foot 54 as it comes down and contacts the box edge.

A stop 83 is provided in the forward most portion of the plate 79 to restrict movement of the foot of each bow past the point where the bow is perpendicular to the length of the opening 46. The stop 83 preferably is formed with ear 85 projecting rearwardly, defining a trap 87 from which the foot 54 can escape only by rearward movement, the direction from which it entered the trap. When contained in the trap 87, the foot 54 is blocked from excessive bouncing relative to the edge of the box 24 by ear 85. Hence, the ear 85 will prevent the inadvertent slipping of the foot 54 over the stop 83, avoiding the undesirable over-extension of a bow 30 beyond the full spanning position.

The plate 79 is attached to the upper edge of the box by bolts 89 which pass through holes in the plate 79 and into the box 24. A taper 91 is formed in the rearward most portion of the plate 79 to gently guide a prematurely landed foot 54 upward and onto the even landing surface 81. The plate 79 is proportioned with a long length to provide a relatively long surface for initial contact to occur, even if shifting, bending and warping over time causes a significant change in the descent of the foot 54 onto the edge of the box 24.

Because the bows 30 are all rigidly joined to one another by the ridgepole 32, they will move in unison and, accordingly, will be prohibited from movement if the rearward most bow is so restricted. Thus, the locking mechanism 38 will prohibit movement of the bows out of the spanning position unless both the actuating portion 76 or 86 of the latch is actuated and simultaneously the bows 30 are swung out of the spanning position.

Movement of the bows and ridgepole may be accomplished from a position behind the trailer box 24. An operator standing on the ground has access to the end of rope 40 which is wound around retainer hooks 42 on the back of the truck 24. The rope 40 passes through ring 80, which is attached to the rearward most bow or ridgepole, and is attached at its other end to latch ring 88. The actuating portion 76 of tongue 72 is connected to ring 88 such that pulling of rope 40 by an operator behind the box will cause the movement of the actuating portion 76 or 86 and rightward movement of tongue 72 or 82, thereby releasing the bows from the lock mechanism 38. The pulling of the rope 40 also simultaneously acts to apply a rearward force to the bows 30, pivoting them to the open position.

Alternatively, the post 44 may be extended to run the height of the box 24 and through the box floor where a handle to pivot the post 44 could be provided. As a second alternative, the post would run through the side wall of the box 24 where a handle would be provided. Operation of such handles would shift the bows between the spanning position and the open position.

The swing movement of the bows 30 will come to a natural stopping point about seven-eighths of the way to completely across the opening 46, removing the bows as an obstacle over the majority of the opening. Further movement is restricted because of contact of the ridgepole against the bows. However, if desired, the various bows, ridgepole and hinge angles could be designed to allow complete 180° rotation to hang outside of the truck box. The rope 40 may be used to retain the bows in the open position by being secured to maintain pulling tension on the bows.

The support structure 26, when in the spanning position, supports the roll-up tarp 28 which may be rolled and unrolled over the bows 30, ridgepole 32 and opening 46. The roll-up tarp 28 is a conventional roll-up tarp including a crank 90 connected to a bar member 92 through a universal joint 94. The covering 96 is rolled and unrolled over the bows 30 with assistance (for the unrolling at least) by the resilient cord 98. Latch plate 100 allows for securing and tightening of the tarp as described in U.S. Pat. No. Re. 31,746, hereby incorporated by reference for detailed disclosure of the roll-up tarp design and use. Tarp stops 102 allow the completely rolled-up tarp to reside out of the way of pivotal bow movement, but prohibit the bar member 92 and rolled material from rolling off the truck box. The free end of the tarp may be secured and tightened in any known way, such as the manner disclosed in U.S. Pat. No. Re. 31,746.

The bows 30 and ridgepole 32 are preferably made from metal tubing known in the art. All other materials for the support structure, including the lock mechanism and hinges, can be made of metal or, alternatively, any other appropriate material known in the art.

The truck cab 22, truck box 24, roll-up tarp 28 and support structure 26 can be used together. The truck 22 (shown as a conventional trailer-pulling truck, but which could alternatively be a utility vehicle with box or container supported on its chassis or other vehicle) is capable of conveying the box 24 from location to location. The roll-up tarp 28 can be closed over opening 46 by being unrolled over the bows 30 which span the opening. When desired, the covering 96 is rolled up on bar member 92 by use of the crank 90 all the way to stops 102. This exposes the interior of the box 24.

Figure 3:
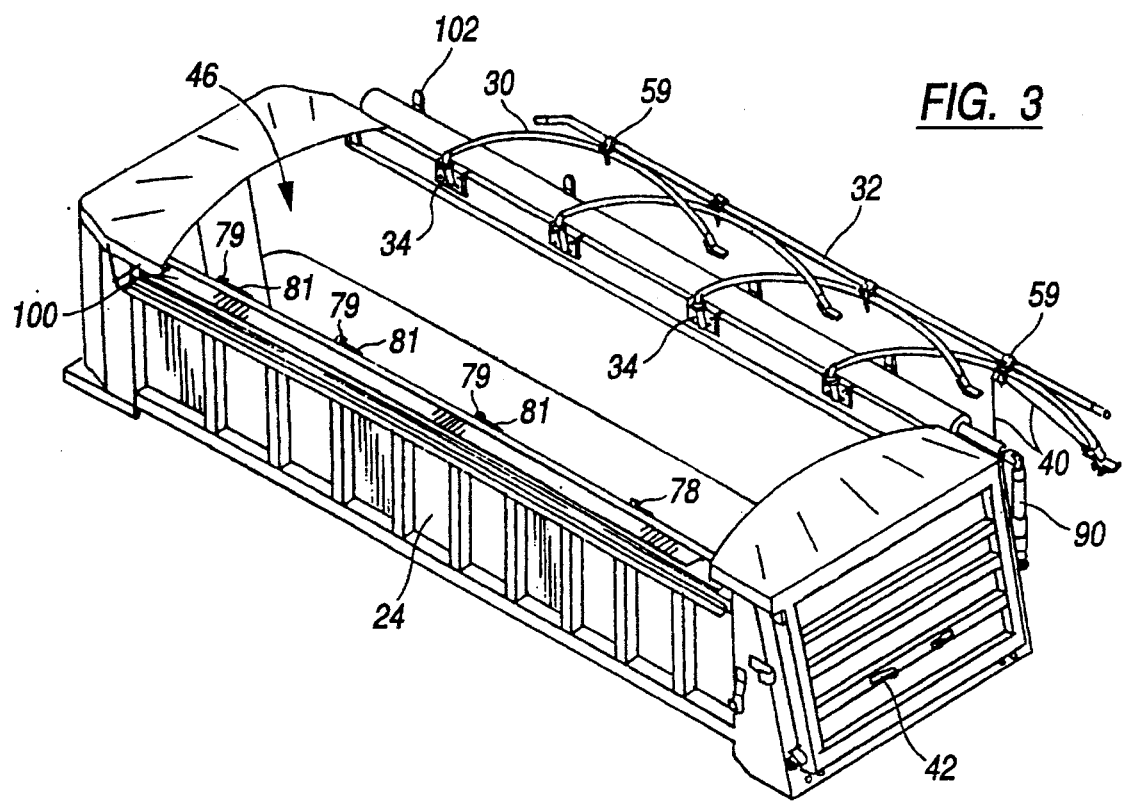
FIG. 3 shows a perspective view of the preferred embodiment with cover rolled back and support in a retracted position.

If the bows 30 are an obstacle to passage of material into or out of the box 24 through opening 46, they may be retracted by pulling of rope 40 which releases lock 38 and swings the bows 32 to the retracted position shown in FIG. 3. At least part of the opening is thereby freed of the bows as an obstacle. The covering is closed by reversing this process, swinging the bows 30 to the spanning position (by releasing the tension on the rope 40 which allows the bows to swing back to that position by force of gravity) which automatically locks the bows in that position, and unrolling the covering 96 over the bows. The free end of the covering is thereafter secured as taught in U.S. Pat. No. Re. 31,746.

From the above description it will be apparent that there is provided a support structure alone, and together with a truck, truck box and covering, and a method having desirable advantages, but which are susceptible to modification in form, method, operation, detail, construction, application, and arrangement without departing from the principles involved or sacrificing any of its advantages.

It is to be understood that the invention is not limited to the specific features shown, but that the means, method, and construction herein disclosed comprise the preferred form of several modes of putting the invention into effect, and the invention is, therefore, claimed in any of its forms or modifications within the legitimate and valid scope of the appended claims.

What is claimed is:

1. A structure to support a removable covering over an opening of a body, the structure comprising:

a plurality of bows spanning the opening, each bow having first end pivotally attached to one side of the opening and second end reversibly engaging the opposing side of the opening; and, connecting means to connect at least two bows to each other, the connecting means being pivotally connected to each connected bow between the first bow end and the second bow end;

whereby the bows may be simultaneously pivoted between a position spanning the opening to a position at least partially retracted from the opening by movement of the connecting means.

2. The invention of claim 1, wherein the connecting means is a rigid pole, the rigid pole pivotally connected along its length to each connected bow between the first bow end and the second bow end.

3. The invention of claim 1, further comprising means for moving the bows from the spanning position to the retracted position.

4. The invention of claim 1 further comprising a means for engaging the second end of at least one bow supported near the opposing side of the opening to prevent pivoting of the bow beyond a position spanning the opening.

5. The invention of claim 4, wherein the engaging means comprises an elongated plate with one elongated edge projecting above the opening to receive the second end of the bow and a rearward projecting ear to prevent upward movement of the second end of the bow when the bow is in the spanning position.

6. A utility vehicle comprising:

an elongated body defining an elongated opening;

means for transporting the elongated body from location to location;

a plurality of bows spanning the opening, each bow having first end pivotally attached to one side of the opening and a second end reversibly engaging the opposing side of the opening; and, connecting means between the bows, the connecting means comprising a rigid pole pivotally connected along its length to at least three bows, the connection to the connected bows being between the first bow end and the second bow end, whereby simultaneous movement of the bows may be accomplished by movement of the connecting means.

7. A method for displacing a plurality of bows capable of supporting a covering over a container opening from a position spanning the opening to a position at least partially retracted from the opening, each bow having a first end pivotally attached to a first side of the opening and a second end reversibly engaging a second side of the opening, at least three bows connected to one another by a rigid pole pivotally attached along its length to the connected bows, the connection to the connected bows being between the first bow end and the second bow end, the method comprising the step of pivoting the bows about their pivotal attachments.

8. The method of claim 7 wherein the bows are parallel to one another and are pivoted in unison.

9. The invention of claim 3, wherein the means for moving the bows is a rope connected to a bow.

10. The invention of claim 3, wherein the means for moving the bows is a rope connected to the connecting means.

11. The invention of claim 1, wherein the connecting means is connected at the middle of each connected bow, 12. The invention of claim 1, wherein bow movement between the position spanning the opening and the position at least partially retracted from the opening occurs substantially in a horizontal plane.

13. A structure to support a removable covering over an opening of a body, the structure comprising:

a bow having a first end and a second end; and pivot means attached to one side of the opening for engaging the first end of the bow to allow pivotal movement about the pivot means;

wherein pivotal movement of the bow relative to the pivot means at least partially lifts the bow from the opening.

14. The invention of claim 13, wherein the pivot means comprises a cylindrical bearing to receive the first end of the bow.

15. The invention of claim 13, wherein the second end of the bow reversibly engages the opposing side of the opening.

16. The invention of claim 14, wherein the longitudinal dimension of the bearing is oriented at an acute angle relative to a perpendicular to the opening.

17. The invention of claim 1, wherein all the bows are connected to the connecting means.

18. The invention of claim 17, wherein the connecting means comprises a single, linear rod.

* * * * *

UNITED STATES PATENT AND TRADEMARK OFFICE
CERTIFICATE OF CORRECTION

PATENT NO. : 5,487,584
DATED : January 30, 1996
INVENTOR(S) : Lee Jespersen

It is certified that error appears in the above-indentified patent and that said Letters Patent is hereby corrected as shown below:

Item [57]  Abstract, line 1, change "one" to --the--.

Item [73], after "Co.", insert --,--.

Col. 2, line 15, change "avoid" to --avoids--.

Col. 6, line 60, change "two" to --three--.

Signed and Sealed this

Sixteenth Day of July, 1996

Attest:

BRUCE LEHMAN

*Attesting Officer*       *Commissioner of Patents and Trademarks*